Figure 1:
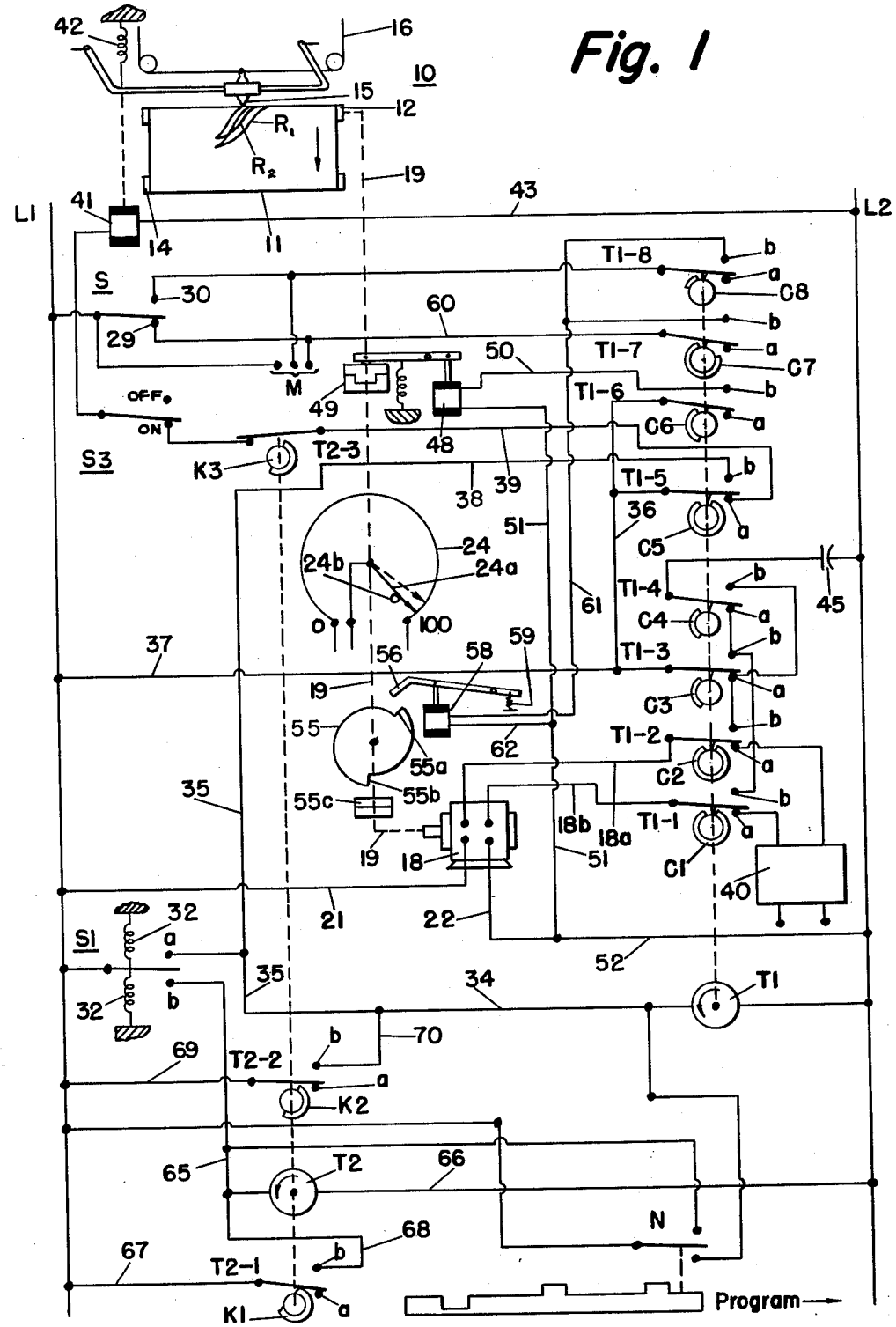

Oct. 23, 1962  A. E. PASCHKIS  3,060,430
CHART ADVANCE SYSTEM FOR A STRIP CHART RECORDER
Filed March 23, 1960  2 Sheets-Sheet 1

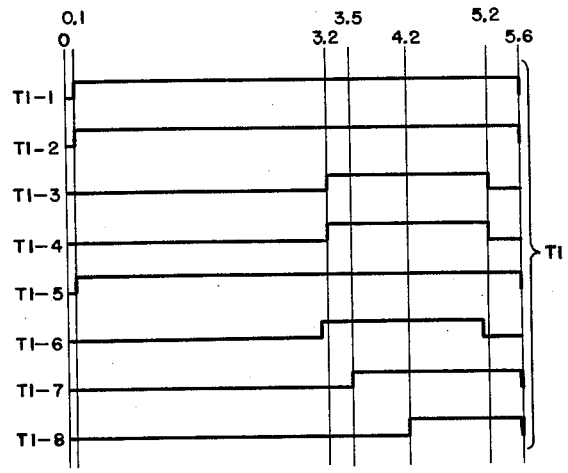
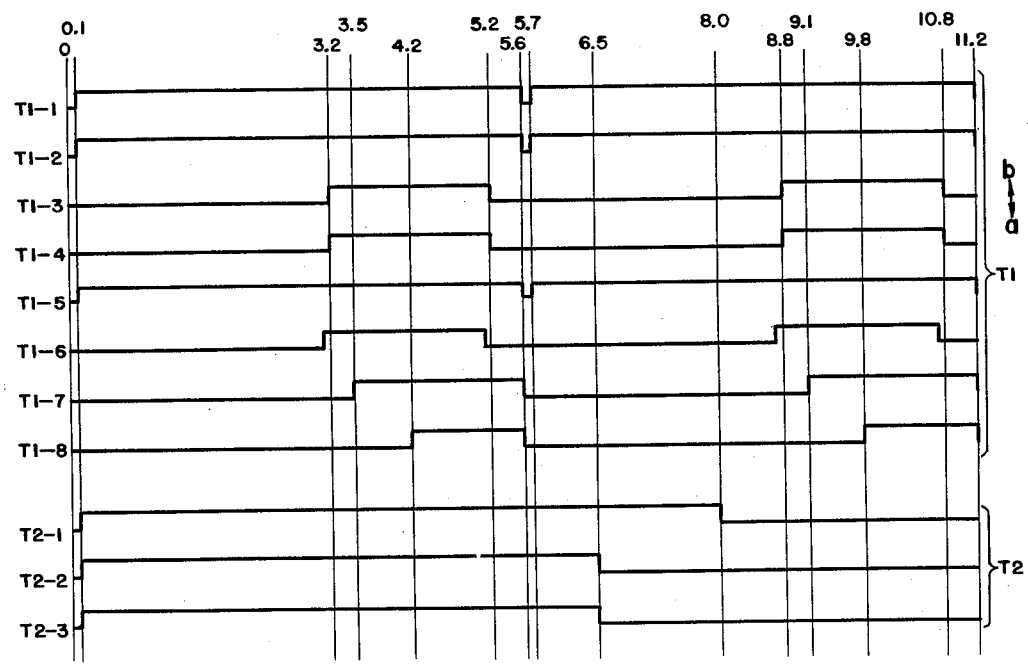
Fig. 2
Fig. 3
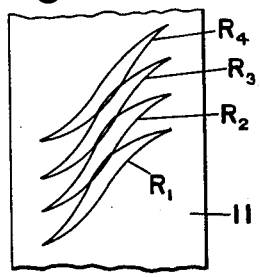
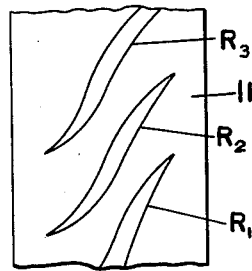
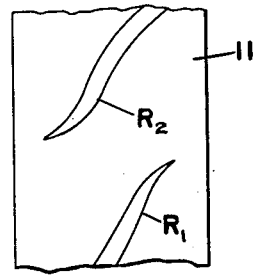
Fig. 4  Fig. 5  Fig. 6

United States Patent Office 3,060,430
Patented Oct. 23, 1962

3,060,430
CHART ADVANCE SYSTEM FOR A STRIP
CHART RECORDER
Albert E. Paschkis, Ambler, Pa., assignor to Leeds and Northrup Company, Philadelphia, Pa., a corporation of Pennsylvania
Filed Mar. 23, 1960, Ser. No. 17,045
13 Claims. (Cl. 346—32)

This invention relates to a chart advance system for a strip chart recorder or the like and has for an object the provision of means for effecting chart advance automatically in increments of predetermined length.

This invention is particularly applicable to recording instruments of the type in which a pen of the instrument moves in accordance with one variable and a chart is driven in accordance with another variable other than time. Recording instruments of this type are known in the art as x–y recorders. One example of such recorder is described and illustrated in U.S. Letters Patent 2,690,951 issued to P. J. Moore. As an example of the type of information which may be recorded by an x–y recorder, there is shown in FIG. 2 of the aforesaid Moore patent a hysteresis or B–H curve. In the past when it has been desired to advance the chart for the making of another record, this has been accomplished manually by rotating a hand wheel on the chart drive roll. This is required in order to prevent the second record from being superimposed on the first record. The operation requires the attention and presence of an operator. The present invention provides an arrangement whereby the chart may be automatically advanced a predetermined step or steps so that there will be presented an entirely fresh chart section for receiving the new record or the chart may be simply stepped ahead by an amount sufficient to avoid confusion between succeeding records.

The present invention in one form thereof is particularly applicable to a strip chart recorder of the x–y type including reversible motor means for driving the chart in accordance with adjustment of an adjustable impedance means of a measuring system thereby to move the chart as a function of a variable. The present invention provides a system for advancing the chart to control the spacing between records on the chart along the length thereof and includes timer means having contact means for electrically disconnecting the reversible motor from the measuring system and connecting the motor across a source of power for operation first in one direction and then the other. A clutch and stop means is provided which is controlled by the timer means and is operative in timed relation with forward and reverse operation of the motor to effect a step shift in the drive of the chart relative to the drive of the adjustable impedance means. Means is associated with the timer means for determining the time of actuation of the stop means and thereby the magnitude of the step, and circuit controlling means is provided for controlling initiation of operation of the chart advance system.

For a more detailed understanding of the invention and for further objects and advantages thereof, reference is to be had to the following description taken in conjunction with the accompanying drawings in which:

FIG. 1 diagrammatically illustrates an embodiment of the invention;

FIGS. 2 and 3 are timing diagrams, useful in describing the modes of operation of the embodiment illustrated in FIG. 1; and FIGS. 4–6 illustrate the results achieved by advancing the chart in increments which differ in length.

Referring to the drawings, the invention has been illustrated in connection with a strip chart recorder of the x–y type, such for example as described and illustrated in the aforesaid Patent 2,690,951. In FIG. 1 the recorder 10 is provided with a strip chart 11 which is threaded over a chart-driving roll or cylinder 12 and over a lower guide roll 14. The chart 11 is fed from a feed roll, and is rewound on a takeup roll as shown in said Moore patent the details of which have not been repeated here. A record of the related variables being measured is traced on the chart 11 by a marker or pen 15 driven by a cord or cable 16, known in the art as a violin string. The violin string 16 is driven from suitable means, not shown, to adjust the marker 15 in response to the magnitude of one variable. The marker 15 may be driven from any suitable measuring system, one example of which is described and illustrated in U.S. Letters Patent No. 2,113,164 to Williams. The chart drive roll 12 is similarly driven in accordance with the magnitude of a second variable by a reversible motor 18, by way of a mechanical connection illustrated as dotted line 19. The details of the recorder 10 as thus far described are conventional and for further details of the driving mechanism, reference may be had to the aforementioned Moore patent.

For purposes of expanation it will be assumed that the recorder 10 in FIG. 1 is being utilized to record B–H hysteresis loops similar to the curves being recorded in FIG. 2 of aforesaid Patent 2,690,951. Such curves yield valuable information and it is desirable to obtain these curves for different materials. Thus a plurality of curves is desired and it is preferable that the curves not be spaced too far apart for ease in comparison.

As shown in FIG. 1, the motor 18 is of the reversible type and has four terminals. One winding is connected across the line L1, L2 by conductors 21 and 22. The other terminals are connected to a winding which may be energized from the line L1, L2 or a measuring circuit as described hereinafter. The motor 18 is adapted to adjust an adjustable impedance such as effecting relative motion between a slidewire 24 and contact 24a of a measuring circuit or system 40 which may be similar to the measuring system 40 illustrated in aforesaid Patent 2,690,951. The adjustable impedance or slidewire 24 forms part of a potentiometer circuit having a suitable source of power, not shown, and the contact 24a is adapted to be connected to the rectangle identified by reference character 40 which is the same reference character used to identify the corresponding measuring system shown in the aforesaid Patent 2,690,951, FIG. 2.

Before proceeding with the description of the invention, it is believed that it will be helpful to point out that in x–y recorders it is desirable that the recorder have the same range of movement in the y direction as in the x direction. For example, if the chart 11 is ten inches in width, i.e., the x direction, it is desirable that the chart be capable of advancing ten inches for full scale in the y direction. Thus the recorder will have the same sensitivity for both the x and y components. Under these conditions it will be seen that for each record the chart area will occupy an area ten inches wide and ten inches long. To bring a new area of chart into position for a subsequent record, it is necessary that the chart 11 be advanced more than ten inches, for example a distance of eleven inches. This will insure that the succeeding record does not overlap any of the previous record on the chart. In some instances records are used for comparison purposes and it is not necessary nor desirable that each record be made on a completely new area of chart. Under these circumstances, it is desirable to advance the chart only enough so that the succeeding records will be offset a slight distance from each other and not be traced one on top of the other. For this purpose, depending upon the size and shape of the curves to be plotted, an advance of one inch may be sufficient. An example of such a record is shown in FIG. 1. In some applications an advance of more than one inch may be desired to achieve complete separation of the records without using an excessive amount of chart paper. For example, in some types of measurement it is desirable that the chart be advanced to present approximately one-half of a new area for recording, that is to say an advance of five and one-half inches. An example of a record of this type is shown in FIG. 5.

Referring now to FIG. 1, the invention will be described in connection with an arrangement where the chart is adapted to be advanced one inch between each record. A single pole double throw switch S controls the length of chart advanced in a single step or cycle of the chart advance mechanism. The movable contact of the switch S is connected to line L1 and is adapted to be moved into engagement with either of contacts 29 or 30. Contact 29 is used to provide a one-inch step while contact 30 is used to provide a five and one-half inch step. For reasons later to be described the number of steps is controllable by a single pole double throw switch S1. The movable contact of switch S1 is also connected to the line at L1. This switch is spring biased by springs 32 to a central off position. The upper contact $a$ is adapted to provide one-step operation whereas the lower contact $b$ is adapted to provide energization of a circuit to produce two-step operation, later to be described.

To advance the chart 11 an increment of one inch, the switch S is moved into engagement with contact 29 and switch S1 is momentarily moved into engagement with the upper contact $a$. This completes a circuit from line L1 through switch S1 and contact $a$ through conductors 35 and 34 to a timer motor T1 and to the opposite side of the line L2. While switch S1 is being momentarily held in engagement with contact $a$, the timer motor T1 is energized and starts to rotate driving a cam C5 to actuate the blade of switch T1–5 to move the latter out of engagement with its lower contact $a$ and into engagement with its upper contact $b$. This completes a holding circuit for timer motor T1. This circuit may be traced from line L1 through conductor 37, conductor 36, the blade of switch T1–5, its $b$ contact, conductors 38, 35 and 34, the motor of timer T1 to line L2. When released, the switch S1 moves to its central or off position under the bias of springs 32. When the switch T1–5 moved out of engagement with its $a$ contact, the energizing circuit for a pen lifter solenoid 41 was broken, permitting the pen 15 to be raised or lifted by a spring 42. This operation removes the pen 15 from contact with chart 11 during the time the chart is being advanced a step to change the recording area. The energizing circuit for the solenoid 41 may be traced from line L1 through conductors 37, 36, switch T1–5 and its $a$ contact, conductor 39, switch T2–3, manually-operated pen lifter switch S3, the coil of solenoid 41, conductor 43 to line L2. The lower contact of switch S3 is engaged by the blade of switch S3 when the solenoid 41 is to be energized for recording. Switch S3 has an "off" position so that the pen 15 may be raised from the chart to prevent recording.

As may be seen in FIG. 2, in the timing diagram or program of the operation of the electrical switches T1–1 to T1–8, the switches T1–1 and T1–2 are operated concurrently with operation of switch T1–5. Switches T1–1 and T1–2 close on their $b$ contacts which switches the control winding of the balancing motor 18 from the amplifier of the measuring system 40 to a phased line supply causing the balancing motor 18 to drive the chart 11 and slidewire contact 24a to the limit of travel at the high end of the Y coordinate, against a mechanical stop 24b. That is to say, the chart is driven to move down as indicated by the arrow, FIG. 1, and the slidewire contact 24a is moved to 100 on the slidewire 24. As seen from the timing diagram in FIG. 2, this is accomplished within approximately three seconds. The switching of the balancing motor control winding is accomplished by movement of cam C1 by timer motor T1 to move the blade of switch T1–1 out of engagement with its contact $a$ and into engagement with its $b$ contact, and by concurrent movement of a similar cam C2 operating switch T1–2 to move the latter out of engagement with its $a$ contact and into engagement with its $b$ contact. After this switching operation the amplifier of system 40 is no longer connected to the control winding of motor 18. Instead the control winding is energized from line L1 by way of conductor 37, the $a$ contact of switch T1–3, the $b$ contact of switch T1–2, the control winding of motor 18 and the $b$ contact of switch T1–1, the $a$ contact of switch T1–4, the capacitor 45 and to line L2.

At the end of the three second time interval, as seen from the timing diagram, FIG. 2, the cam C6 engages the blade of switch T1–6 moving it out of engagement with its $a$ contact and into engagement with its $b$ contact thereby energizing a clutch operating solenoid 48. When solenoid 48 is energized, it disengages a clutch 49 which is in the mechanical connection 19 between the chart drive roll 12 and the motor 18. This permits the motor to run and move the slidewire contact 24a without moving the chart. The energizing circuit for solenoid 48 extends from line L1 through conductors 37 and 36, switch T1–6 and the $b$ contact thereof, through conductor 50 and the coil of solenoid 48, conductor 51 and conductor 52 to the line L2.

From the foregoing description it will be seen that when switch T1–6 is moved to its upper position, the solenoid 48 is energized and the motor may drive the slidewire contact without imparting motion to the chart. The predetermined size of the steps in which the chart is advanced are determined by a cam 55 which is fixed in relation to the contact 24a of the slidewire 24. This cam has lobes 55a and 55b one or the other of which is adapted to engage a stop 56 which may be moved into and out of the path of the lobes of the cam 55 by a solenoid 58. The stop 56 is biased to an upper or inactive position by means of a spring 59.

While clutch 49 is disengaged, cams C7, C3 and C4 are operated by timer motor T1 for moving the blades of their respective switches T1–7, T1–4 and T1–3 upwardly into engagement with their respective $b$ contacts. This movement of switch T1–7 is concurrent with or soon after movement of the blades of switches T1–3 and T1–4. It energizes solenoid 58 to move the stop 56 into operating position at a time in the cycle such that it will engage lobe 55a of cam 55. The circuit for solenoid 58 may be traced from line L1 through switch S, contact 29, conductor 60, switch T1–7, its $b$ contact, conductor 61, solenoid 58, conductors 62, 51 and 52 to the line L2. The concurrent or slightly prior movement of switches T1–3 and T1–4 to their upper positions shifts the phase of the current and voltage to the control winding of the balancing motor 18 causing the latter to rotate in the opposite direction. This drives the slidewire contact 24a down scale from the solid line position shown toward the dotted line position. Cam lobe 55a engages stop 56 and thereafter clutch 55c will slip. This permits the slidewire contact 24a to be returned to the dotted line position without a corresponding movement of the chart 11. Thus the chart 11 has been shifted one inch with respect to slidewire contact 24a. The recorder is now ready for return to normal recording operation.

As may be seen in FIG. 2, switch T1–6 is operated to close on its $a$ contact and then switches T1–3 and T1–4 are operated to close on their $a$ contacts ready for a subsequent chart advancing step. However, prior to the motor 18 having carried the contact 24a back to the end 100 of slidewire 24, the timer T1 times out and the switch cams C1—C8 are returned to their original positions. Switch T1–5 will have returned to its original or zero position, thus deenergizing the timer motor T1 and terminating the cycle. All of the other switches will have returned to their zero positions, switching the balancing motor 18 back to the amplifier of the measuring system 40 and reenergizing the pen lifter solenoid 41 preparatory to making another record on chart 11. The new record will occupy an area one inch advanced with respect to the area occupied by the previous record.

While the single-step advance has been described in connection with one-inch movement, such movement may be of greater length. For example, this movement may be in the order of five and one-half inches. This movement will be accomplished by moving switch S out of engagement with contact 29 and into engagement with contact 30. This operation removes the effect of switch T1–7 from the circuit and renders switch T1–8 effective for controlling the energization of solenoid 58 which actuates the stop 56. The operation of the circuit with switch S in engagement with contact 30 is similar to that previously described with switch S in engagement with contact 29, the only difference being that the solenoid 58 is energized later in the cycle. This permits lobe 55a of cam 55 to pass the stop 56 prior to actuation thereof. The timing is such that lobe 55b is rendered effective so that contact 24a may be driven down scale the amount necessary to introduce a shift between the slidewire contact and the chart to produce a chart advance of five and one-half inches. This may be seen by reference to the timing diagram shown in FIG. 2 where it will be seen that switch T1–8 is not actuated to its upper position until approximately 4.2 seconds have elapsed whereas switch T1–7 is actuated at the end of about 3.5 seconds. This difference in time controls which of the lobes 55a or 55b is engaged by stop 56.

From the foregoing description it will be seen that the chart 11 may be advanced in one step which may be either one short step, such for example as a one-inch step, or a larger step, such for example as a five and one-half inch step. It will now be described how the chart 11 may be advanced in two fixed steps, such, for example as two short steps or two large steps. To effect advance in two short steps the switch S is closed on contact 29 and the spring return switch S1 is moved downwardly into engagement with the lower contact b and held there momentarily. This completes a circuit through a second timer motor T2 which rotates cams K1, K2, and K3. This circuit may be traced from L1, through switch S1, conductor 65 to one side of timer T2 and through a conductor 66 to line L2. Cam K1 is effective to close switch T2–1 which completes a holding circuit for the timer motor T2 from L1 to L2 by way of conductors 67, 68 and 66. Cam K2 closes switch T2–2, energizing the timer motor T1 from L1, L2 by way of conductors 69, 70 and 34. Cam K3 opens switch T2–3 to open the circuit to solenoid 41 and thus insure immediate deenergization of the pen lifter solenoid so that the pen will be raised from the chart. The operation of switches T2–1, T2–2 and T2–3 by their respective operating cams K1–K3 is shown in the timing diagram of FIG. 3 along with the operation of the T1—T1–8 switches. The timer motor T1 completes one cycle of operation in accordance with the one-step sequence described above and since contacts T2–1 to T2–3 are still closed, the timer motor T1 begins a second cycle. Soon thereafter, switch T2–2 opens and switch T2–3 closes returning the control of the cycle to the timer motor T1. The switch T2–1 then opens permitting the timer motor T2 to time out. The result of this sequence has been to provide a space on the chart between successive x-y plots equal to twice the space provided by the one-step sequence. That is to say, the chart 11 has been advanced two equal short steps rather than one short step. The length of steps, as pointed out above, is controlled by the position of switch S.

As previously described in connection with FIG. 1, the chart advance mechanism has been adjusted for a spacing of one short step between adjacent records R1 and R2, such step, for example, being in the order of 1″. In FIG. 4 there is illustrated the type of record resulting from a two short step chart advance where adjacent records R1—R4 are separated by a distance corresponding to about 2″. FIG. 5 illustrates the type of record produced when the chart is advanced in one long step of five and one-half inches, such step being equivalent to approximately one-half the step required for a complete change of recording area. In FIG. 6 there has been illustrated a record derived from a double long step advancement where a complete change of recording area of chart is presented for each succeeding record R1 and R2. The spacing between records in FIG. 6 is double the spacing illustrated in FIG. 5, which is equivalent to a chart advancement of 11″.

It will be understood that the effects of switches S and S1 may be produced from remote signals applied at M and N and in accordance with any predetermined program. Thus, advance of the chart 11 by predetermined amounts in accordance with any desired program may be made to take place at predetermined intervals. As shown in FIG. 1, a program can determine the number of steps to be taken by the chart 11 and at what intervals.

It is to be understood that the present invention is applicable to any measuring and recording system utilizing a servo-system with feedback. The term adjustable impedance means has been used both in the specification and claims generically to include the feedback element whether it be in the form of a slidewire, control transformer, differential transformer, selsyn or other equivalent means.

While there has been described a preferred embodiment of the invention, it is to be understood that further changes and modifications thereof may be made without departing from the scope of the appended claims.

What is claimed is:

1. In a strip chart recorder of the x–y type including a recording element movable across the chart as a function of one variable and reversible motor means connected to drive the chart in accordance with adjustment of an adjustable impedance means of a measuring system thereby to move the chart as a function of another variable, the improvement comprising a system for advancing the chart to control the spacing between records on the chart along the length thereof, said chart advance system including timer means having electrical contact actuating means sequentially operable to electrically disconnect the chart driving reversible motor from the measuring system and connect said motor across a source of power and effect operation of said motor first in one direction and then the other during a selected interval of time, clutch and stop means controlled by said timer means and operative during said interval in timed relation with the forward and reverse operation of said motor to effect a step shift in the drive connection between said motor and said chart relative to the drive connection between said motor and said adjustable impedance means, means associated with said timer means for selectively determining the time of actuation of said stop means during said interval of time and thereby determining the magnitude of said step, and circuit controlling means controlling initiation of operation of said chart advance system.

2. In a strip chart recorder of the x–y type according to claim 1, means controlled by said timer means for lifting the recording element with respect to the chart during advancement of the chart between recording operations.

3. In a strip chart recorder of the x–y type according to claim 1 wherein said circuit controlling means includes a second timer means for repeating the cycle of operation of said first-named timer means thereby to provide additional selectivity in determining the magnitude of the shift.

4. In a strip chart recorder of the x–y type according to claim 3 wherein said adjustable stop means comprises rotatable cam means driven by the motor, said cam means having stop structures thereon, and cooperating stop structure selectively controlled by one of said timer means and movable into the path of one of said stop structures on said rotatable cam at a predetermined time.

5. In a strip chart recorder of the x–y type according to claim 1 wherein said stop means comprises rotatable cam means driven by the motor, said cam means having stop structure thereon, and cooperating stop structure controlled by said timer means and movable into the path of said stop structure on said rotatable cam at a predetermined time.

6. In a strip chart recorder of the x–y type according to claim 5 wherein said rotatable cam means has spaced stop structure selectively engaged by said cooperating stop structure at predetermined times to determine the magnitude of the step movement of the chart between records.

7. In a strip chart recorder of the x–y type including reversible motor means for driving the chart in accordance with adjustment of adjustable impedance means of a measuring system to move the chart as a function of a variable, the improvement comprising a system for controlling the advancement of the chart in predetermined steps to provide spacing between records on the chart including timer means, electrical switch means under the control of said timer means for electrically disconnecting the reversible motor from the measuring system and connecting the motor across a source of power for operation first in one direction and then the other, means controlled by said timer means for effecting mechanical displacement between the driving connection between the motor and the chart and the driving connection between the motor and the adjustable impedance means by a selectable predetermined amount while the motor is disconnected from the measuring system, and circuit controlling means effective on said timer for selecting said predetermined amount.

8. In a strip chart recorder of the x–y type including reversible motor means for driving the chart in accordance with adjustment of adjustable impedance means of a measuring system for moving said chart as a function of a variable, the improvement comprising a system for controlling the advancement of the chart a predetermined amount to provide spacing between records on the chart including timer means, switching means under the control of said timer means for electrically disconnecting the reversible motor from the measuring system and connecting the motor across a source of power for operation thereof first in one direction and then the other, means also controlled by said timer means while said motor is connected to said source of power and operative in timed relation with operation of said motor in said one direction and then the other for effecting displacement of the drive connection from said reversible motor to said chart and said adjustable impedance means by a predetermined amount, said means for disconnecting said motor thereafter operating to reconnect said motor to said measuring circuit, and circuit controlling means effective to initiate operation of said system.

9. In a recorder of the type including reversible motor means for adjusting an adjustable impedance means of a measuring system and concurrently moving an element of the recorder as a function of a variable the improvement comprising a system for controlling the spacing between records on the chart including timer means with electrical contact means programmed for electrically disconnecting the reversible motor from the measuring system and connecting the motor across a source of power for reversible operation under the control of said timer, and clutch and stop means under the control of said timer to effect drive of said chart by said measuring circuit motor while disconnected from said measuring circuit to produce chart advance of a predetermined amount, said timer thereafter effecting disconnection of said motor from said source of power and reconnection of said motor to said measuring circuit.

10. In a strip chart recorder of the x–y type including reversible motor means for driving the chart in accordance with adjustment of adjustable impedance means of a measuring system thereby to move the chart as a function of a variable, the improvement comprising a system for controlling the advancement of the chart to provide a predetermined spacing between records on the chart including timer means having electrical contact means programmed for electrically disconnecting the reversible motor from the measuring system and connecting the reversible motor across a source of power and effecting operation of the reversible motor first in one direction and then the other, clutch means controlled by said timer means for disconnecting the reversible motor from the chart during rotation of the reversible motor in said other direction, adjustable stop means controlled by said timer effective to produce a shift in the mechanical connection between the adjustable impedance and the chart during drive in said other direction and to limit the relative movement therebetween in accordance with a predetermined amount directly related to the desired predetermined spacing between records, first circuit controlling means for controlling said timer means, and second circuit controlling means effective on said timer means for controlling the length of each step in the chart advancement.

11. A step chart advance system for an x–y recorder of the type wherein the chart is moved as a function of a variable including a measuring system having a balancing motor to move said chart, said system comprising a timer operated control switch including a plurality of contacts, means to initiate operation of said control switch, a first set of said contacts operated upon initiation of operation of said control switch to close a holding circuit for said switch and effect transfer of connections of the balancing motor from the measuring system to a source of supply line voltage adapted to operate the motor to drive the chart and its related adjustable impedance to one of the scale limits of the variable, a second set of said contacts operable subsequent to arrival of the chart and the adjustable impedance at said limit to actuate means to disengae the drive connection between the balancing motor and the chart, a third set of said contacts effective upon closure to operate a stop to limit adjustment of the adjustable impedance by said motor when subsequently operated in direction opposite that which drove said impedance to said scale limit, said stop thereby determining the magnitude of the step of chart advance, and a fourth set of said contacts operable subsequent to operation of said third set of contacts to effect reversal of the balancing motor to adjust the adjustable impedance to a value determined by said stop, said second set of contacts subsequently operating to switch the balancing motor from said source of supply line voltage to the measuring system, and said timer operated control switch timing out to restore all of said contacts to their original positions.

12. A step chart advance system according to claim 11 wherein said control switch includes a fifth set of said contacts closed subsequent to closure of said third set of said contacts, means for selectively including one of said third and fifth sets of said contacts in said system, said fifth set of said contacts being effective to operate said stop at a later time thereby to provide a step of chart advance different in magnitude from that provided by said third set of said contacts.

13. A step chart advance system according to claim 11 wherein said control switch is controlled by another control switch to control successive operation of said control switch thereby to effect multiple step chart advance.

References Cited in the file of this patent

UNITED STATES PATENTS 2,714,047    Dehmel _____ July 26, 1955
2,939,757    MacDonald et al. _____ June 7, 1960